United States Patent [19]

Chia

[11] Patent Number: 5,322,824
[45] Date of Patent: Jun. 21, 1994

[54] ELECTRICALLY CONDUCTIVE HIGH STRENGTH DENSE CERAMIC

[76] Inventor: Kai Y. Chia, 822 The Circle, Lewiston, N.Y. 14092

[21] Appl. No.: 67,958

[22] Filed: May 27, 1993

[51] Int. Cl.$^5$ ............................................. C04B 35/56
[52] U.S. Cl. ...................................... 501/89; 501/90; 501/92; 252/516
[58] Field of Search ...................... 501/88–92, 501/100; 252/504, 516; C04B 35/56

[56] References Cited

U.S. PATENT DOCUMENTS

| | | | |
|---|---|---|---|
| 3,171,871 | 3/1965 | Watson et al. | 264/104 |
| 3,875,476 | 4/1975 | Crandell et al. | 317/98 |
| 3,875,477 | 4/1975 | Fredriksson et al. | 317/98 |
| 4,120,827 | 10/1978 | Boos et al. | 252/512 |
| 4,135,937 | 1/1979 | Murata et al. | 106/44 |
| 4,135,938 | 1/1979 | Murata et al. | 106/44 |
| 4,179,299 | 12/1979 | Coppola et al. | 106/44 |
| 4,205,363 | 5/1980 | Boos et al. | 361/264 |
| 4,230,497 | 10/1980 | Schwetz et al. | 106/44 |
| 4,327,186 | 4/1982 | Murata et al. | 501/92 |
| 4,555,358 | 11/1985 | Matsushita et al. | 252/516 |
| 4,701,427 | 10/1987 | Boecker et al. | 501/92 |
| 4,753,903 | 6/1988 | Saito | 501/88 |
| 5,164,345 | 11/1992 | Rice et al. | 501/91 |
| 5,214,010 | 5/1993 | Whittemore | 501/105 |

FOREIGN PATENT DOCUMENTS 60-195057 10/1985 Japan ............................ C04B 35/56

OTHER PUBLICATIONS

"Silicon Carbide Heating Elements and Their Use in the Glass Industry", *Glass*, Oct. 1984.
"The Silicon Carbide Igniter", *Appliance Engineering*, vol. 7, No. 4, 1973.
"Effects of Elemental Additives on Electrical Resistivity of Silicon Carbide", *J. Am. Ceram. Soc.* 70(10) C-266-C-267 (1987).
"Flexural Strength of High Performance Ceramics at Ambient Temperature", Dept. of Army, MIL-S-TO-1942A, Nov. 1990.

*Primary Examiner*—Helene Klemanski
*Assistant Examiner*—Chris Gallo
*Attorney, Agent, or Firm*—R. Lawrence Sahr

[57] ABSTRACT

A low cost pressureless sintered silicon carbide ceramic composite having relatively high electrical conductivity, relatively high density and relatively great mechanical strength, in comparison to those known to persons skilled in the art, and a process for making such composites.

23 Claims, No Drawings

ELECTRICALLY CONDUCTIVE HIGH STRENGTH DENSE CERAMIC

BACKGROUND OF THE INVENTION

1. Field of the Invention

The invention relates to relatively low cost pressureless sintered silicon carbide ceramic composites having relatively high electrical conductivity, relatively high density and relatively great mechanical strength, in comparison to those known to persons skilled in the art, and a process for making such composites.

2. Background of the Invention

For many devices in the electrical power, electrochemical and gas appliance industries, there is an increasing need for conductive ceramics with light weight, good thermal conductivity, high mechanical strength and good oxidation resistance, especially at elevated temperatures. Such ceramics can serve to conduct electrical current, absorb power surges, generate heat for many purposes and/or serve as elevated temperature structural elements. For reasons of economy, it is usually highly preferable that such articles and devices be made from relatively inexpensive raw materials, but that such articles and devices also last for a substantial length of time in service. Additionally, it is often very desirable that the materials be readily formable into complex shapes at relatively low cost; for ceramic materials, this often requires pressureless sintering and mass production shaping methods, such as injection molding and dry pressing.

Conventionally, for electrically conductive heating elements, recrystallized silicon carbide material is used to form the body. The reasons often stated for using a recrystallization process include the driving off of impurities, including without limitation excess, uncombined silicon, and to otherwise react as much free silicon as possible with carbon to produce additional silicon carbide. Further, recrystallization is employed by some in an attempt to ensure that all of the structure is crystalline, and that the crystals are all of the α-phase, to ensure more uniform electrical resistivity. Also, recrystallization is believed by some to serve to bond the crystalline structure together by reformation of the crystals so as to produce crystalline grain growth.

A recrystallized silicon carbide body usually has the required electrical conductivity [between about 1 and 100 $(\Omega\text{-cm})^{-1}$], however, such bodies, e.g., in the form of heating elements, tend to be of relatively low density (typically less than about 2.5 gram/cm$^3$), with a relatively high degree of porosity and relatively quite low strength. Furthermore, it is often difficult, if not impossible, to achieve sufficient control, in the manufacture of such recrystallized silicon carbide heating element bodies, to obtain precise electrical and mechanical properties, due to the very high furnacing temperatures required for formation, e.g. in the range of 2300° C. to 2500° C.; furnace temperatures in such temperature ranges are inherently difficult to control, given the present state of the art in high temperature furnace design combined with the degradation of the furnace interiors and seals, from run-to-run, through repeated heat-up and cool-down.

Within a temperature range of 2300° C. to 2500° C., silicon carbide tends to sublimate, resulting in random porosity which reduces density, weakens the body thus produced, and results in somewhat unpredictable and uncontrollable variations in electrical properties. Further, the nature of the process attempts to achieve a precisely balanced and complete chemical reaction, between silicon and carbon, to form silicon carbide from the free carbon impurities contained in the beginning silicon carbide material, during the period of heat-up to recrystallization temperature while in the furnace.

The reason for attempting to eliminate free carbon is in an effort to control electrical conductivity within the body produced, as carbon is an electrical conductor, and discrete randomly placed and randomly sized pockets of trapped free carbon within the final body can tend to result in widely varying and unpredictable results in respect to electrical conductivity, the antithesis of manufacturing precision. Further, the entrapped free carbon pockets tend to reduce the physical strength of the final body and to produce porosity by gasification of that carbon near the surface which is not completely entrapped.

It seems, however, that an excess of free silicon metal must be added in order to convert substantially all of the free carbon; this process is sometimes referred to as "siliconizing" or "reaction bonding" of the silicon carbide, and it is sometimes performed with the addition of a controlled amount of free carbon over and above the free carbon impurities which are contained in silicon carbide starting materials. However, some of the excess free silicon tends to remain trapped within the heating element body at random, discrete locations. Alternatively, the excess silicon, especially that near the surface of the heating element body, tends to be driven off as a gas to leave random porosity which varies in size and location in a manner which is virtually impossible to precisely control given the required economic parameters for profitable manufacture. The random variations in product composition, coupled with the random porosity, tend to produce varying, imprecise degrees of product properties, including imprecise electrical conductivity and reduced mechanical strength. The result is that final product quality is quite often less than desirable, and usable product yield tends to be quite low, for example, only 60% to 70% or less. Thus, the market price for those products which are deemed marketable is driven up to cover the cost of the scrap.

In an attempt to overcome these problems, and also to produce articles for other end uses, hot press sintered silicon carbide bodies have, in the past, been made available to the market, and pressureless sintered silicon carbide structural bodies are presently available. Some of these bodies may contain up to a 15% addition of free carbon (beyond that in the original particulate silicon carbide) derived from carbon black, graphite or carbonized organic compositions. Such silicon carbide bodies may well have the required electrical conductivity and improved strength for use at room temperature. However, the excess carbon contained in the final product is not suitable for many high temperature applications, specifically for use in high temperature oxidizing atmospheres, e.g., air and hot steam. Moreover, hot pressing is well known to be a decidedly un-economically viable method for the manufacture of products with complex shapes or for mass production, and the pressureless sintering of such bodies is known to require very exacting sintering temperature range control, so as to produce sufficiently high enough temperatures to produce complete sintering, but not so high as to generate sublimation, e.g, a rather narrow sintering temperature range of about 2150° C. to about 2190° C., for a narrowly specified time range.

Several variations of pressureless sintered silicon carbide ceramics are known to those skilled in the art. For example, some known silicon carbide/graphite/carbon ceramic composite bodies are known to exhibit very low electrical resistivity (i.e. high conductivity). However, graphite/carbon containing materials do not have suitable oxidation resistance for applications as, for example, heating elements. Further, the inclusion of graphite and carbon tends to significantly reduce structural strength.

Other known pressureless sintered silicon carbides, with very low free carbon, have very low electrical conductivity (i.e. high electrical resistivity). Such silicon carbide materials can be used for structural application, as they have very good high temperature strength and oxidation resistance, however, when it comes to electrical applications, they can only be used as an electrical insulating barrier, i.e., as an insulator, such as may be required of an electronic semiconductor substrate.

Pressureless sintered silicon carbide/titanium composites are known; such tend to have quite low electrical resistivity (less than 1.0 Ω-cm and in some cases less than 0.2 Ω-cm). Such materials may be produced by adding a conductive titanium compound, such as titanium carbide or titanium nitride, up to about 3 weight percent (hereinafter "Wt.%"), to the silicon carbide particulate before sintering. A variation of such a material may be produced by adding a distinct, electrically conductive titanium diboride second phase, in an amount of about 5 to 20 Wt.%, to the sintered silicon carbide phase so as to develop quite low electrical resistivity. It is well known, however, that titanium compounds are readily oxidized in air at elevated temperatures. Moreover, the inclusion of titanium compounds tends to reduce structural integrity of the sintered silicon carbide at elevated temperatures. Thus, these material systems are not considered suitable for high temperature applications.

None of these predominantly silicon carbide composite material appear to be capable of manufacture with specific, precise electrical conductivity, with sufficient mechanical strength and with sufficient oxidation resistance, for use as long-life heating elements, as electrodes or as igniters, as currently being demanded, respectively, by furnace manufacturers, the electrochemical industries and the gas appliance industry. Thus, there remains a need for a material having all of the above mentioned properties, which is capable of being prepared from low cost non-toxic ingredients, and which can be cost effectively manufactured into the complex shapes desired by the producers of furnaces and gas burning appliances.

SUMMARY OF THE INVENTION

The present invention comprises a pressureless sintered silicon carbide ceramic composite article preferably having a D.C. electrical conductivity of at least 0.05 $(\Omega\text{-cm})^{-1}$, a density of at least 2.9 grams per cubic centimeter, as measured by the Archimedes method, and a flexural bend strength of at least 150 MPa, preferably at least 400 MPa, as measured by a four point bend strength test. That sintered silicon carbide ceramic composite article is preferably capable of exhibiting p-type silicon carbide semiconductor characteristics. The pressureless sintered silicon carbide ceramic composite article comprises from about 0.5 Wt.% to about 6.0 Wt.% of aluminum, from about 0.1 Wt.% to about 2.0 Wt.% of boron, from about 0.1 Wt.% to about 6.0 Wt.% of free carbon (uncombined carbon, i.e. carbon which is not combined with silicon, boron and/or aluminum), and at least about 90.0 Wt.% of silicon carbide, that silicon carbide being predominantly of the alpha phase. (As used herein, the words "predominant", "predominantly" and "predominates" in context mean greater than 50 Wt.%.) The aluminum in the article of the present invention is present in at least as great a percentage by weight as the boron.

The sintered composite material of the present invention may be adapted for use in the manufacture of heat generating devices and articles wherein the heat is generated by conducting electrical current through such devices and articles. Such an electrical conductive device or article may, at times and in some circumstances, be referred to as a heating element, an electrode or an igniter. The sintered composite material of the present invention, which has relatively high thermal conductivity and thermal stability, is also adaptable for use in the manufacture of bulk ceramic resistors for high-current and high-voltage heat dissipation. The sintered composite material of the present invention, which has high electrical conductivity and corrosion resistance, is also suitable for the production of electrodes for use in electrochemical industries. Further, the sintered composite material of the present invention, which has relatively high mechanical strength, is also suitable for use in the manufacture of load supports, wear resistant devices and other structural applications, such as, for example, bearings and mechanical seals. Moreover, the composite material of the present invention, which has relatively high thermal conductivity, oxidation resistance and corrosion resistance, is also suitable for use in high corrosion applications and high temperature applications, e.g., in the manufacture of heat transfer devices, such as crucibles and heat exchangers.

The present invention comprises a pressureless sintered, substantially homogeneous, silicon carbide composite with fine grain structure and low grain growth due in part to the use of pressureless sintering as distinguished from hot press sintering, due in part to the type, quantity and processing of the sintering additives, and further due in part to the sintering temperature range applied to achieve high density products. This fine grain structure and low grain growth enhance both the electrical conductivity and the flexural bend strength of the present invention. The article of the present invention preferably has an electrical conductivity preferably of at least about 0.05 $(\Omega\text{-cm})^{-1}$, and has a flexural bend strength of at least about 150 MPa, preferably at least 400 MPa.

The present invention overcomes the above-described drawbacks of recrystallized silicon carbide (whether siliconized or not), hot pressed silicon carbide and presently known pressureless sintered silicon carbide bodies, all in respect to precise and controlled electrical conductivity, strength, and oxidation and corrosion resistance, especially at elevated temperatures. The present invention provides a p-type silicon carbide semiconductor material which has high density, high mechanical strength, good oxidation and corrosion resistance, and specific and precise high electrical conductivity, for use in many mechanical and/or electrical applications.

The present invention comprises a process for producing a pressureless sintered silicon carbide ceramic composite article preferably having a D.C. electrical conductivity of at least 0.05 (Ω-cm)$^{-1}$, a density of at least 2.9 grams per cubic centimeter, as measured by the Archimedes method, and a flexural bend strength of at least 150 MPa, preferably at least 400 MPa, as measured by a four point bend strength test, that article preferably being capable of exhibiting p-type silicon carbide semiconductor characteristics, that process which comprises:

(a) milling and blending at least 90 Wt.% silicon carbide, that silicon carbide initially (before milling and blending) having a maximum particle size of about 100 microns and that silicon carbide being predominantly of the alpha phase, with from about 0.5 Wt.% to about 6.0 Wt.% of at least one aluminum containing additive, from about 0.1 Wt.% to about 2.0 Wt.% of at least one boron containing additive, with the total aluminum of the aluminum containing additive or additives being present in at least as great a percentage by weight as the total boron of the boron containing additive or additives, and at least one carbon source material capable of providing free carbon, preferably amorphous carbon, in an amount capable of providing from about 0.1 Wt.% to about 6.0 Wt.% of that free carbon, to produce a raw batch blend; (b) forming that raw batch blend into a shaped body; and (c) heating that shaped body in an atmosphere inert to the silicon carbide, the aluminum containing additive, the boron containing additive, and the free carbon to obtain that article.

One aspect of the method of the present invention comprises milling and blending silicon carbide particles having a particle size below about 100 microns (1 meter = 1,000,000 microns) with from about 0.5 to about 6.0 Wt.% of an aluminum additive, selected from a group of various aluminum compounds; with from about 0.1 to about 2.0 Wt.% of boron, selected from various boron containing compounds; and with from about 0.1 to about 6.0 Wt.%, preferably about 0.1 to about 3.0 Wt.%, of active carbon powder, carbon containing compounds and/or polymers; forming the blend into a compacted, shaped body; and heating the shaped body in an inert environment, without the simultaneous application of mechanical pressure, at a temperature range of between about 1,820° C. to about 2,080° C., for a time sufficient to obtain a sintered ceramic body having a density of at least 90% of the theoretical density of silicon carbide, that theoretical density which is 3.21 g/cm$^3$.

The present invention provides a method for making a dense, electrically conductive silicon carbide ceramic composite, by way of pressureless sintering, a method which has a better control over both the physical and electrical properties in comparison to the reaction bonding or recrystallization methods, and which is capable to making products with complex shapes.

The present invention also comprises a raw batch blend from which can be produced a pressureless sintered silicon carbide ceramic composite article preferably having a D.C. electrical conductivity preferably of at least 0.05 (Ω-cm)$^{-1}$, a density of at least 2.9 grams per cubic centimeter, as measured by the Archimedes method, and a flexural bend strength of at least 150 MPa, preferably at least 400 MPa, as measured by a four point bend strength test, that article preferably being capable of exhibiting p-type silicon carbide semiconductor characteristics, that raw batch blend comprising:

(a) at least 90 Wt.% silicon carbide, that silicon carbide initially having a maximum particle size of about 100 microns and that silicon carbide being predominantly of the alpha phase;

(b) from about 0.5 Wt.% to about 6.0 Wt.% of at least one aluminum containing additive;

(c) from about 0.1 Wt.% to about 2.0 Wt.% of at least one boron containing additive; and (d) at least one carbon source material capable of providing free carbon, in an amount capable of providing from about 0.1 Wt.% to about 6.0 Wt.% of that free carbon;

wherein the total aluminum of the aluminum containing additive or additives is present in at least as great a percentage by weight as the total boron of the boron containing additive or additives, and wherein the free carbon is preferably amorphous carbon.

DETAILED DESCRIPTION OF THE INVENTION

A pressureless sintered silicon carbide body according to the present invention comprises a p-type SiC-(Al,B) semiconductor solid solution system with minute trace amounts of aluminum, boron and carbon in the grain boundaries, the body having excellent oxidation and corrosion resistance, high strength and low electrical resistivity.

The p-type silicon carbide sintered body according to the present invention has a maximum low volume resistivity of less than 100 Ω-cm and is adaptable for application, for example, as a heating element or a hot surface igniter; the body may also be electrical discharge machined (EDM).

A silicon carbide sintered body according to the present invention can be sintered to a density higher than 90%, preferably higher than 93%, of the theoretical density of silicon carbide, within the preferred temperature range of about 1,900° C. to about 2,050° C., although satisfactory sintering can be accomplished within the range of about 1,820° C., in some cases as low as about 1,800 ° C., to about 2,080° C. This silicon carbide system with low temperature sintering capability has a tremendous impact on: (a) reducing the potential for grain growth while concurrently greatly improving the strength of the sintered body, (b) increasing the size of the sintering temperature range processing window, thus resulting in a substantially greater quality product yield, (c) achieving better and more precise control in regard to electrical properties, and (d) reducing the furnacing (sintering) cost by reducing the sintering temperature range.

Also the sintered silicon carbide body according to the present invention can have very fine grain size which can be readily post "hipped" (hot isostatically pressed), after formation of a sintered body, and thus consolidated (further densified) to near theoretical density (3.21 g/cm$^3$), producing a body which exhibits extremely high strength. This hipped silicon carbide with extremely high strength is suitable for advanced applications, such as, for example, use as components for power plant gas turbine engines and jet aircraft engines, and can have flexural bend strength as high as 800 MPa or greater.

The reason for the relatively low electrical resistivity of the silicon carbide body in the present invention is due to the doping of aluminum atoms and boron atoms into the silicon carbide crystalline lattice structure, through a diffusion mechanism at elevated temperatures, to form a p-type SiC(Al,B) semiconductor.

The dopant concentration levels in the SiC crystalline lattice structure can be controlled by the amount of additives in the initial raw batch blend, the specific furnacing (sintering) temperature and the total soaking time at sintering temperature in the furnace.

Experiments have shown that the aluminum dopants have a more profound effect on reducing the electrical resistivity of silicon carbide than do the boron dopants. Although the reason for this phenomenon is not completely clear, it is thought that substantially all of the aluminum atoms replace silicon atoms in the SiC crystalline lattice structure to form a pure p-type SiC semiconductor. The foregoing indicates that the article of the present invention is capable of exhibiting p-type silicon carbide semiconductor characteristics, i.e., the relative capability to uniformly conduct current flow therethrough without substantial resistance.

On the other hand, it is believed that due to their small atomic atom size, only a relatively smaller number of boron atoms replace carbon atoms in the sintered SiC to form a pure p-type SiC semiconductor, with the larger portion of boron atoms believed to be diffused in the interstitial sites within the SiC crystalline lattice, between the silicon and carbon atoms, to form a SiC composite, solid solution which tends to "nanoscopically" distort the SiC crystalline lattices. (Use of the word "nanoscopically" is intended to indicate that detection is only available through use of apparatus and techniques capable of detecting elements which are present in quantities normally measured only in nanometers.) It is believed that this distorted crystalline lattice SiC composite, solid solution generates greater electrical resistivity because the boron atoms are largely diffused in the interstitial sites between the silicon and carbon atoms in the SiC crystalline lattice, and no p-type SiC semiconductor is created by such boron atom diffusion of the boron atoms in those interstitial sites between the silicon and carbon atoms within the SiC crystalline lattice. In other words, because the boron atoms do not substantially replace carbon atoms within the SiC crystals, but rather are predominantly only diffused within the SiC crystalline lattice structure to separate the silicon and carbon atoms, those boron atoms tend to disrupt atomic electron exchange.

In the present invention, it has been found necessary to include as much, and preferably more, aluminum in the final sintered body, in comparison to the amount of boron, so as to produce the desired electrical conductivity, while the boron is preferably adjusted to dampen the electrical conductivity, i.e., to introduce some minor amount of resistivity, to produce the desired specific range of electrical conductivity. In this way, the p-type silicon carbide semiconductor characteristics may be adjusted and controlled to the desired degree. Thus, the article of the present invention is capable of exhibiting p-type silicon carbide semiconductor characteristics which can be altered as required for the particular application by alteration, within the parameters of the present invention, of the aluminum and boron components of the raw batch.

It has been noted that commercially available sintered SiC, e.g., Hexoloy ® SA as produced by The Carborundum Company, and also by Hitachi Chemical Co., Ltd. and Kyocera Corporation, generally includes only boron and carbon as a material additives. The boron so added, on first impression, could be classified as a p-type dopant source. However, the sintered SiC tends to be relatively quite high in electrical resistivity. If the boron replaced the carbon atoms, the resistivity would be low, as a p-type semiconductor material would be formed. But such is not the case as evidenced by the relatively high resistivity. Thus, the boron can only be located either in the grain boundaries within the SiC crystals or in the interstitial space between the silicon and carbon atoms. Nanoscopic investigation indicates the presence of predominantly carbon in the grain boundaries, but relatively little boron. Thus, the boron must be located interstitially within the SiC crystalline lattice between the silicon and carbon atoms, with only a relatively small number of the overall present boron atoms replacing carbon in the SiC crystalline lattice structure. Thus, Hexoloy ® SA sintered silicon carbide is not capable of exhibiting significant p-type silicon carbide semiconductor characteristics, as the electrical resistivity is too great.

Grain growth problems are not uncommon for both SiC-Al-C and SiC-B-C sintered systems. The average grain size for high density SiC sintered body is about 8-10 microns for SiC-Al-C systems, for example as described in U.S. Pat. No. 4,230,497, and is about 7-10 microns for SiC-B-C systems, for example as described in U.S. Pat. Nos. 4,179,299 and 4,346,049. By comparing these U.S. Patents, it is clear that abnormal grain growth during sintering is significantly more likely to occur in a SiC-Al-C system than in a SiC-B-C system at a sintering temperature higher than about 2050° C., but the reason for this phenomenon is not at all clear from a reading of those U.S. Patents. It appears that the grain growth problem is less severe for the SiC-B-C system, however, higher sintering temperatures (greater than 2,100° C.), which encourages grain growth, are needed for the SiC-B-C system to obtain acceptably high densities.

A major achievement of the present invention is found in the development of SiC composite compositions which can be sintered to high density at much lower temperature (at about or below 1,850° C.) thus avoiding the grain growth problems. The average grain size for the dense sintered body of the present invention can be smaller than 2 microns, and is normally in the range of 2-6 microns when sintering temperatures do not exceed 2,180° C. The lower sintering temperature not only eliminates the major grain growth problems, but also widens the processing temperature window for quality products, increases the yield of quality products and saves energy.

From the well known SiC-B$_4$C phase diagram, it is known that the SiC-B$_4$C binary system has a eutectic point at around 2,240° C. There also has been speculation that theoretically one or more impurities may be discovered which may be dissolvable into both SiC and B$_4$C, and thus may function as an effective catalyst to reduce the eutectic point of the SiC-B$_4$C system. Some scant literature, relating to the solubility of impurities in silicon carbide, is available, however, it appears that there is no available solubility data relating to the solubility of impurities in boron carbide.

It has been discovered, through experiments with the present invention, that if the amount of aluminum is equal to or greater than the quantity of boron in the SiC-B$_4$C system, the aluminum will apparently function as a catalyst to substantially decrease the eutectic temperature of the SiC-B$_4$C system and promote the densification of that system, even without the aluminum being dissolved in the boron carbide, if all the ingredients as described herein are processed to specific characteristics, as also described herein. The reasons for the ingredient requirements and the limits on the additive components and the sintering conditions of the present invention will be hereinafter explained.

SILICON CARBIDE POWDER

The silicon carbide starting material has been found to have many different specific crystalline structures, as well as at least one amorphous, non-crystalline structure. For the present invention, essentially alpha, non-cubic, silicon carbide is the preferred starting material. Such alpha-phase silicon carbide may be obtained from commercial production of silicon carbide by the Acheson process. Alpha-phase silicon carbide derived from the Acheson process typically contains a variety of specific crystalline structures or polytypes, the most common being both hexagonal polytypes, predominantly 6H, 4H, 2H, and rhombohedral polytypes, e.g., 15R.

It has been theorized that there up to about 1,500 or more crystalline SiC polytypes, most occurring in very minuscule percentages, in Acheson process silicon carbide, including a single cubic polytype known as the beta or 3C polytype which is occasionally present up to about 2 Wt.%. In the parlance of SiC crystalline polytype designation, the 3C polytype is known as the beta phase, while all other crystalline polytypes are referred to as the alpha phase. The alpha phase polytypes are recognized as being relatively stable, i.e., none of those polytypes is readily converted to another polytype. On the other hand, the beta phase polytype is viewed as relatively unstable, being quite easily converted or "transformed" to the alpha phase by the application of heat, beginning at about 1,500° C. and above. This phase transformation from beta to alpha is almost always coincident with grain growth unless something is present to inhibit or prevent that grain growth. It has been found that if a sufficient quantity of alpha phase SiC powder is evenly disbursed between and among the particles of finely divided beta SiC, the grain growth can be substantially inhibited, if not eliminated. The object is simply to keep the beta SiC particles separated from each other so that, upon phase transformation, the individual beta particles cannot combine to produce grain growth. Amorphous SiC, which is not crystalline, undergoes a phase transformation to the beta phase beginning at about 1,450° C.

In the present invention, it is believed to be acceptable to use mixtures of alpha and beta, alpha and beta and amorphous (non-crystalline), or alpha and amorphous silicon carbide, all in which alpha-phase silicon carbide predominates, so as to decrease, at sintering temperatures and somewhat below, the possibility of occurrence of the well known phase transformation phenomena of amorphous SiC to beta SiC and beta SiC to alpha SiC, and the corresponding well known grain growth problems associated with such phase transformations.

Acheson process silicon carbide can be green or black in color; green grain SiC is relatively more pure, containing about 99.0% or more SiC, while the black grain SiC is only about 97.5% pure. Black grain SiC usually contains more free silicon, carbon and aluminum as impurities.

The silicon carbide powder must be of fine particle size. Coarser material can be milled, using well known techniques, until sufficient quantities of fine particle size silicon carbide are obtained and the proper size of silicon carbide can be selected from the milled product by conventional means, such as sedimentation. Alternatively, there are several sources of commercially available grades of sufficiently fine particle size silicon carbide, e.g., Norton Company, Worcester, Mass., U.S.A. and Showa Denko K.K., Tokyo, Japan. Sintered silicon carbide grinding media are preferably employed in the milling of SiC to avoid contamination. Prior to milling, the particle size of the silicon carbide powder should be limited to a maximum of 100 microns so as to enable economically feasible milling. Such "premilled" powders can be accumulated from successive sieving and screening processes as are well known to those skilled in the art. Suitable silicon carbide powders have a maximum particle size of about 5 microns or less, after milling, and submicron size particles are preferred. However, it has been found possible to use SiC powder which includes particle sizes ranging from submicron up to about 15 microns, sometimes referred to as 1200 grit size, without substantial milling beyond what is described in the following examples.

It is difficult, however, to obtain accurate particle size distributions for silicon carbide powders having a particle size of much less than 1 micron, and the surface area of the silicon carbide particle is a more relevant characteristic in determining suitable material.

Accordingly, the preferred silicon carbide particles for use in the process of the present invention to produce sintered composite ceramic bodies of the present invention are specified as having from about 1 to about 20 square meters/gram surface area (BET surface area). Within this range it is more preferred that the BET surface area of the silicon carbide particles range between about 5 and 17 square meters/gram and within this range, most preferably surface areas between about 7 and about 15 square meters/gram which have been found to be easily obtainable, through well known milling and sedimentation techniques, and quite useful for producing sintered composite ceramic bodies of the present invention.

The silicon carbide material should be relatively free of materials such as free silicon, silicon dioxide and oxygen which may interfere with the sintering operation. The silicon carbide powder may contain minor amounts of impurities such as graphite, aluminum, boron or traces of free silicon without deleterious effect, although the inclusion of significant quantities of nitrogen may be detrimental to the p-type semiconductor properties of the final sintered body, as is hereinafter explained. Generally, a SiC purity of greater than about 95 percent is required, and a higher purity is preferred.

Black grain SiC contains more aluminum in its structure and electronically shows a greater degree of p-type semiconductor behavior coupled with greater electrical conductivity, in comparison to green grain. From the electrical property point of view, black grain is a more favorable SiC raw material to start with for the present invention. Also, black grain SiC accounts for more than 90% of the worldwide total SiC production and it is a much less expensive raw material than green grain SiC. Therefore, from the economic point of view, black grain SiC is also a much preferred starting material.

However, grain growth phenomenon at sintering temperatures higher than 2,050° C. is more severe for black grain SiC than for green grain SiC. This is believed to be caused by a higher content of beta SiC in the black grain SiC than found in the green grain SiC. Black grain is not conventionally used for engineering applications, such as heating elements and mechanical seals, due to the higher level of impurities and the grain growth problems. It is a major breakthrough of the present invention that either SiC material, green or black grain, can be sintered to high density at lower temperatures, avoiding grain growth problems and thus rendering all forms of Acheson process SiC capable of readily being used in the present invention.

ALUMINUM ADDITIVE

At least one aluminum containing sintering aid should be present in the raw batch of the present invention in a quantity sufficient to provide from about 0.5 to about 6.0 % by weight of elemental aluminum. The best results with regard to densification and higher electrical conductivity are obtained with aluminum powder as a sintering aid, although aluminum compounds such as aluminum carbide and aluminum nitride can be used. Further, it is possible to use compounds such as aluminum stearate, which can serve the purpose of both a temporary binder and an aluminum source, as well as a source of carbon. The aluminum additive apparently plays two important roles in this silicon carbide system: first it appears to act as a reactive catalyst to decrease the eutectic temperature of the SiC-$B_4C$ system and second it appears to function as a p-type dopant to enhance the electrical conductivity of sintered silicon carbide.

If aluminum is present in an amount of less than about 0.5 Wt.%, sintering does not proceed sufficiently quickly enough for commercial purposes at lower temperatures around 1,900° C. and below, and the electrical conductivity of the sintered body will sometimes be lower than 0.05 $(\Omega\text{-cm})^{-1}$. On the other hand, if the amount of aluminum exceeds 6 Wt.%, the excess aluminum will remain in the grain boundary region, and it will thus decrease the oxidation resistance and the high temperature strength of the sintered body. Therefore, the amount of aluminum is specified to be in the range of 0.5-6.0 % by weight.

BORON ADDITIVE

Any of several well-known boron containing SiC sintering additives, e.g., elemental boron, boric acid, various borate compounds, boron carbide, etc., may be used in the present invention, however, boron carbide is preferred due to the fact that it only contains two elements, both of which are required in the present invention, and because it is considerably less expensive and more available than high purity elemental boron.

Boron carbide is essentially a non-stoichiometric material and various boron carbide materials having a molar ratio of boron-to-carbon between 8 to 1 and 2 to 1, i.e., $B_8C$ and $B_2C$, have been reported. Thus, reference to "boron carbide" and "$B_4C$" herein is intended to include all readily and commercially available molar ratios of boron carbide.

The boron carbide can be crystalline or non-crystalline, preferably particulate, and of a size less than 10 microns. Within this limitation, it is preferred that the boron carbide be of a size ranging from about 0.1 to about 4 microns to facilitate forming a homogeneous mixture with the other powdered component ingredients.

As mentioned before, it is known that fine boron carbide particles will react with silicon carbide to form a SiC-$B_4C$ eutectic phase at a temperature around 2,240° C. However, according to the present invention, it is believed that this eutectic reaction can proceed at a much lower temperature (e.g., between about 1,800° C. and about 1,900° C.) in the presence of aluminum. This low temperature SiC-$B_4C$-Al theoretical eutectic enables and expedites the densification of the system at that lower temperature so as to eliminate or reduce the grain growth phenomenon, even through the aluminum does not apparently dissolve into the $B_4C$. The theoretical eutectic phenomenon of the present invention is likewise present where other boron additives are used, e.g., elemental boron, thus it appears that it is not confined to those cases where only $B_4C$ is used.

At the final stage of densification, the boron will predominantly diffuse into the SiC crystalline lattice to form a SiC(B) solid solution and leave trace carbon and trace boron carbide in the grain boundaries. But it is believed that most boron atoms migrate to and remain in the interstitial space between the silicon and carbon atoms within the SiC crystalline lattice, thus causing a distortion of the SiC crystalline lattice structure, to form a composite, while only a small percentage of boron atoms replace carbon atoms to form a p-type SiC(B) semiconductor. It is preferable that boron carbide content be in the range of about 0.3 to 2.0 Wt.%. Below 0.3 Wt.% $B_4C$, the system becomes increasing difficult to sinter at low temperature because not enough SiC-$B_4C$-Al eutectic phase is formed. However, where elemental boron is used, instead of $B_4C$, the weight percentage of boron can be as low as about 0.1 Wt.%. At more than 2.0 Wt.% of boron, the electrical conductivity of the system begins to decrease. This is believed to be due to the increase in SiC crystalline lattice distortion and electrical current path blockage, or insulation, caused by an increasing number of boron atoms being interposed between the adjacent silicon and carbon atoms within the SiC crystalline lattice; it is believed that this also tends to hold those adjacent silicon and carbon atoms slightly further apart, creating more of a gap for the electrical current electrons to traverse. If boron is present in an amount of more than about 4.0 Wt.%, much of that boron will remain in the grain boundary regions. If elemental boron, or some boron containing compound other than $B_4C$ is used, some of the boron in the grain boundaries will potentially react with the carbon in the grain boundaries to form $B_4C$ in those grain boundaries. Since boron carbide is a more electrically conductive phase than silicon carbide, the resulting sintered composite body will show a slightly greater degree of electrical conductivity, but not sufficiently great enough to use that body as an igniter. However, it is well known that boron carbide is not considered an oxidation resistant material, thus the resulting sintered composite cannot well be used at elevated temperatures in an oxidizing environment such as hot air or hot steam. Thus, for the foregoing reasons, $B_4C$, in a raw batch amount of from about 0.3 Wt.% to about 2.0 Wt.%, is preferred as the boron containing additive, although where electrical conductivity is not a critical factor, the $B_4C$ can be increased up to a maximum of 4.0 Wt.%.

CARBON

Uncombined carbon (free carbon) is also believed to be necessarily present, in an amorphous or crystalline form and in small quantity, at the initiation of sintering. Sufficient uncombined carbon may be present in the silicon carbide powder as received and even after it is acid treated to remove impurities. Acid treated submicron silicon carbide powder typically contains at least 0.2 percent uncombined carbon, and this, with no more, may be sufficient carbon for the present invention. The reason why it is believed necessary to include uncombined carbon is to ensure that both combined and free oxygen are removed from the system through the reaction of oxygen and carbon to form principally carbon dioxide gas which off-gases into the furnace atmosphere.

It is preferred, however, that the uncombined carbon be provided by use of a water soluble or an organic solvent soluble, organic material which can be coked at temperatures below sintering temperatures, e.g. below about 1,000° C., to form amorphous carbon. It is preferred that the carbon source material be dissolved organic material, in liquid form, as such is readily evenly disbursed in the raw batch during the milling and blending thereof, tending to at least partially coat substantially most of the silicon carbide particles therein.

Particularly preferred carbon source materials are phenolic resins and coal tar pitch which have char yields of about 25 Wt.% and about 40 Wt.%, respectively, although any water or solvent soluble organic material, which can be coked to provide amorphous uncombined carbon, is acceptable provided the organic material has a char yield of from about 10 to about 90 percent by weight. It is preferred that from about 2.0 Wt.% to about 8.0 % Wt.% of an organic material, which provides from about 0.1 Wt.% to about 2.0 Wt.% of free carbon to the raw batch, be employed in that raw batch. This is in addition to any free carbon which may exist in the SiC raw material. The total amount of uncombined carbon in the raw batch from all sources should not exceed about 6 Wt.% of the overall weight of the raw batch mixture of ingredients, exclusive of the temporary binder, as higher amounts tend to increase the difficulties related to sintering, i.e., inhibit precise sintering to consistent high densities, and to decrease the strength of the final sintered body; this appears to be true even when the quantity of free carbon in the final sintered body turns out to be within the range of about 0.; Wt.% to about 2.0 Wt.%. Apparently, when the amount of uncombined carbon in the raw batch exceeds about 6 Wt.% of the raw batch, exclusive of the temporary binder, the more uncombined carbon which is gasified at elevated temperatures, the less the strength of the final sintered body. It should be made clear, at this point, that although amorphous carbon is preferred as the free carbon additive in the raw batch, finely divided crystalline carbon powder, e.g., graphite powder, may be used if the particle size thereof is sufficiently small, i.e., no greater than about 4 microns, preferably submicron, to enable even disbursement of the free carbon throughout the raw batch during the milling and blending thereof.

TEMPORARY BINDER

The raw batch may optionally contain a temporary binder to facilitate the formation, from that raw batch, of a shaped green body which is to be thereafter sintered, although the addition of a temporary binder in some cases has been found to be unnecessary. (As used herein, the term "green body" does not indicate that green grain silicon carbide was used, but rather is a term of art which indicates a compacted ceramic shape which has not yet been fired.) The temporary binder may be employed in amounts up to about 25 Wt.% of the raw batch, exclusive of the temporary binder. An example of an acceptable and simple temporary binder is a water solution of dissolved polyvinyl alcohol. Starches, sugars, fatty acids, polymer resins, stearates, etc. are other examples of useful temporary binders as well as carbon source materials. In some cases, just the simple addition of water, and nothing else, provides an adequate temporary binder.

It is to be noted that a temporary binder, when present, may contribute to the quantity of free carbon (e.g., amorphous carbon) present in the batch, and the total uncombined carbon present is to be adjusted accordingly to maintain the limits herein set forth. In fact, the temporary binder may do double duty in that it also provides the carbon source. For example, phenolic resins and solvent diluted coal tar pitch may serve as temporary binders as well as carbon sources.

SINTERING

After the ingredients of the raw batch are mixed together, the mixture may be shaped into different configurations via any conventional method, such as, for example, dry pressing, green machining, injection molding or slip casting. Various shaping methods, advantageously enhanced by the use of different temporary binders as are well known to those skilled in the field of non-oxide ceramic sintering, may readily be applied to the present invention.

When a temporary binder is present, the temporary binder may be and is preferably cured by heating the shaped body at an appropriate temperature below sintering temperature for an appropriate time, usually ranging from several hours to several days depending on the nature of the binder and the size of the components.

The shaped green body is then fired in either a vacuum or in an inert atmosphere which may be at an atmospheric pressure of less than, equal to or greater than one atmosphere of pressure, but without application of mechanical pressure such as that of hot press sintering, to produce a sintered silicon carbide ceramic body according to the invention; such firing is herein referred to as "pressureless sintering". The inert atmosphere may be either static or flowing. The atmosphere used is preferably argon, although any naturally occurring atmospheric gas to which the ingredients of the raw batch are inert may be used, although the use of nitrogen creates problems in the formation of a p-type semiconductor characteristics in the final sintered SiC body, as outlined hereinafter. Nitrogen, however, can be readily used where there is little concern for electrical conductivity, i.e., wherein it is desired to form only a high strength, high temperature resistant structural ceramic article.

Firing takes place from about 5 minutes to about 12 hours at maximum temperatures in a range of from about 1,820° C. to about 2,180° C., preferably from about 1,850° C. to about 2,050° C. Due to the nature of the furnaces and the high temperatures involved, total firing cycle time is usually much greater than the time at maximum temperature. Typically, the temperature ramp-up rate is in the range of about 17° C. to about 20° C. per minute, although the sintering may be performed in a tube type furnace which will produce a much more rapid temperature ramp-up rate, e.g., the total ramp-up may only take 5 minutes or less. Sintering temperatures lower than about 1,820° C. do not reliably achieve the desired specific electrical conductivity, and higher temperatures, above 2,180° C. appear to yield sporadic and random physical and electrical property result variations, in the final sintered body, which are not entirely predictable.

The sintering may be performed in a closed or batch-type furnace, in which case the sintered articles will typically remain in the furnace until the furnace interior is cooled down to room temperature; this slow cool-down rate is to protect the furnace interior and is not required for the present invention. As mentioned above, the sintering may be performed in a tube-type furnace with a relatively rapid temperature ramp-up rate and also a corresponding relatively rapid cool-down rate.

The resulting sintered body may, when of a bulk density of about 2.90 g/cm$^3$, and typically will, exhibits slight open porosity, e.g. up to about 5 volume percent. When bulk density of the sintered body is about 3.15 g/cm$^3$, open porosity is only about 0.05 volume percent. Bulk density is that which is determined by application of the well known Archimedes technique for ascertaining the density of solid objects.

What is preferably produced is an electrically conductive, dense ceramic composite final sintered body having a D.C. electrical conductivity preferably of at least 0.05 $(\Omega\text{-cm})^{-1}$ at room temperature, a bulk density of at least 2.90 gram per cubic centimeter and a bend strength of at least 150 MPa. The body is preferably comprised of at least 90 Wt.% of p-type silicon carbide (SiC) semiconductor material, about 0.6 to 5.0 Wt.% of aluminum, about 0.1 Wt.% to about 2.0 Wt.% by of boron substantially in solid solution with the silicon carbide, about 0.1 Wt.% to about 2.0 Wt.% of free carbon (uncombined carbon) predominantly in the grain boundary areas between the silicon carbide grain structures, and preferably at most about 1.0 Wt.% of all other impurities combined, if other impurities are at all detectable. The aluminum appears to serve, during sintering, as an eutectic reaction catalyst for the SiC-B$_4$C binary system, and in the final sintered body as a p-type dopant source for the SiC.

The use of pressureless sintering techniques, for the sintering of silicon carbide, as distinguished from hot press sintering (hot pressing) techniques, given the same sintering temperature and time at sintering temperature, are well known to produce a much greater degree of naturally occurring fine grain structure, significantly smaller grain size and a significantly more equiaxed grain shape. Pressureless sintering techniques incur significantly less grain growth in the sintering of silicon carbide in comparison to what is found when hot pressing is employed, all other parameters being equal. The smaller and more refined grain structure tends to simultaneously enhance both the electrical conductivity and the flexural bend strength of the articles of the present invention.

On the other hand, hot press sintering tends to produce more elongated grains which tend to be more directionally oriented, thus decreasing fracture strength, i.e., causing the hot press sintered bodies to be more easily fractured from bend force applied normal to the predominant direction of grain orientation. The elongation of the grains, and their orientation, in hot press sintering, tend to be perpendicular to the axis of pressure applied to the surface of the body as it is sintered. In lay parlance, the grains tend to be squashed and flattened as they are formed by the applied mechanical pressure of hot press sintering. The pressure also tends to cause individual grains to combine, tending to induce grain growth. Thus, the distinction between hot press sintering and pressureless sintering can be readily noted from micrographic inspection and comparison of the final sintered bodies.

The following examples are included to illustrate and not to limit the article, method and raw batch of the present invention.

EXPERIMENTAL EXAMPLES

Examples 1 Through 4

Total 192.8 grams of particulate black grain SiC, having a mean particle size of about 0.5 microns, were recovered from the treatment of a larger batch of the same material with a mixture of 50% nitric acid and 50% acetic acid. The SiC powder used was measured for particle size using a Horiba TM Model LA-500 Particle Size Analyzer. The indication was a mean particle size of 0.48 microns, with 71 Wt.% of the particles being less than 1.0 microns. The average BET surface area of the SiC powder was about 12 m$^2$/gram. 200 grams of the SiC powder were then acid treated in a 50 vol.% - 50 vol.% solution of 47% concentration nitric acid and 20% concentration acetic acid. The combination of the acid solution and the 200 grams of SiC powder had a volume of about 500 cc in an inert polyethylene plastic container of ½ gallon size. The acid solution containing the SiC powder was allowed to soak for 48 hours at room temperature, then the acid solution was drained and the remaining SiC powder was repeatedly washed in distilled water, in an attempt to neutralize the acidity. Then the so neutralized SiC powder was dried in a bake oven at 50° C.

The acid treated SiC was then blended with 1.2 grams of boron carbide of 98% purity having a particle size of about 4 microns (obtained from Advanced Refractory Technology, Inc. of Buffalo, N.Y., U.S.A.), 1.34 grams of aluminum powder of 99% purity having a particle size of about 20 microns (obtained from The Aluminum Company of America, Pittsburgh, Pa., U.S.A.) and 10.6 grams of Plyophen TM 90-151 phenolic resin, liquid form (obtained from Reichold Chemical, Inc., White Plains, N.Y.), comprising phenolic resin $\approx$ 55 Wt.%, water $\approx$ 38 Wt.%, free phenol $\approx$ 2 Wt.% maximum, and free formaldehyde $\approx$ 5 Wt.% maximum. The phenolic resin had a char yield of 4.66 grams, which was determined by measuring the weight of a sample of the phenolic resin at room temperature, then baking that sample at 800° C. for one hour in an argon or nitrogen atmosphere, then re-weighing the sample to determine the percentage of the weight of the baked sample in comparison to the sample before baking. To this was added 12 grams of polyvinyl alcohol (obtained from E. I. Dupont de Nemours, Wilmington, Del., U.S.A.), as weighed in solid form, but dissolved in distilled water, with the solute being 25 Wt.% of the solution; this solution was blended with the SiC, B$_4$C, Al and phenolic resin and served as a temporary binder.

This raw batch blend, consisting of the SiC, B$_4$C, Al, phenolic resin and temporary binder, was then ball milled and blended with Hexoloy ® sintered silicon carbide grinding media, 12.5 mm × 12.5 mm in size (obtained from The Carborundum Co., Niagara Falls, N.Y.) in a polyethylene bottle for 41 hours in the presence of distilled water to cover the powder ingredients and media. The ball milling and blending was done by constantly rotating the polyethylene bottle, containing the blend and distilled water, on a U.S. Stoneware jar roller. The raw batch blend was then dried for 24 hours in a bake oven at 50° C., with occasional stirring to ensure that all the water was evaporated. Then the dried raw batch blend was sifted through an 80 U.S.G. mesh plastic screen.

About 10 grams of the resulting powder raw batch blend were then pressed for each green sample. Each 10 gram sample was placed in a steel mold cavity (the mold being in the form of a cylindrical section) and leveled with a wooden ruler. Molding was performed using a two-ton Dorst mold press, Model TPAP-2, at a molding pressure of about 8 kilogram/mm² to form a compact sized at about 3.25 centimeters in diameter by about 0.6 centimeters high. About 1 Wt.% of the compact, of each of the above referenced boron carbide powder and the above referenced aluminum powder were dusted around the green (un-sintered) compacts to create a partial pressure of sintering additives in the atmosphere during sintering so as to stabilize the sintering additives within the compacts, and thus diminish the propensity for those sintering additives to gasify at elevated sintering temperatures. This dusting is desirable, and thus preferred, but is not viewed as necessary, as high-density sintered SiC bodies have been produced without dusting, in accord with the present invention, although with somewhat of a relative diminishment of the sintering additives included in the raw batch.

Sintering was performed at atmospheric pressure by firing the molded green body in a static argon atmosphere at an average rate of temperature increase of 20° C. per minute. The sintering furnace used was a LAB-MASTER ® model, made by Thermal Technology, Inc. Prior to sintering, the furnace seals were checked and found to be in excellent condition. The furnace hearth and liners were graphite, and the furnace interior was thoroughly cleaned before each run. Prior to the present sintering work, the furnace had been used to sinter $Si_3N_4$, but the interior was thoroughly cleaned before beginning the present sintering work. The compacts to be sintered were placed in a graphite crucible with a graphite lid, but the lid was left unsealed. The graphite crucible containing the compacts and covered with the graphite lid was then placed in the furnace. During sintering, temperatures were measured through the furnace window using a two-color pyrometer which had been recently calibrated. After the temperatures, as listed in Table 1, were maintained for the indicated retention time, the sintered bodies were allowed to cool. The cooling was effected by simply turning off the furnace power and permitting the furnace interior, and its contents therein, to cool to room temperature without opening the furnace during cooling.

The densities of the resulting sintered bodies were measured using the Archimedes method (the method used to measure density for all samples recited herein), and the results are listed in Table 1. The dimensions of the sintered compacts were measured and the shrink rate was determined to be in the range of about 17% to 21% The samples were polished and photo micrographs were taken, both as-polished and as-polished and etched. Electrical resistivity was not measured as it is relatively difficult to accurately and reproducibly determine electrical resistivity for disk-shaped samples, as distinguished from bar shaped samples.

TABLE 1

| Example No. | Sintering temperature | Retention time | Density, gm/cm³ | Relative density % T.D.* |
|---|---|---|---|---|
| 1 | 2,150° C. | 30 minutes | 3.119 | 97.2 |
| 2 | 2,000° C. | 30 minutes | 3.155 | 98.3 |
| 3 | 1,950° C. | 30 minutes | 3.166 | 98.6 |
| 4 | 1,900° C. | 30 minutes | 3.150 | 98.1 |

*Theoretical density ("T.D.") of solid silicon carbide is 3.21 gm/cm³.

Comparative Examples C1 Through C4

Two hundred grams of acid treated green alpha-phase SiC containing 0.6 Wt.% boron carbide and 2.33 Wt.% of carbon (as determined from the char yield of the phenolic resin) as used in Examples 1 through 4 were mixed, dried, molded and sintered in the same way, and under the same condition, as in Examples 1 through 4 above, except that only about 1 Wt.% of $B_4C$ powder was used to dust the green compacts. The significant difference between Examples 1 through 4 and Examples C1 through C4 is that there was no aluminum sintering additive in the mix of the comparative Examples C1 through C4 and no aluminum powder dusted around the green compacts before sintering. The density results for Examples C1 through C4 are listed in Table 2. Again, electrical resistivity was not measured for Examples C1 through C4 as it is relatively difficult to accurately and reproducibly determine electrical resistivity for disk-shaped samples.

TABLE 2

| Example No. | Sintering temperature | Retention time | Density, gm/cm³ | Relative density % T.D. |
|---|---|---|---|---|
| C1 | 2,150° C. | 30 minutes | 3.120 | 97.2 |
| C2 | 2,000° C. | 30 minutes | 2.960 | 92.2 |
| C3 | 1,950° C. | 30 minutes | 2.640 | 82.2 |
| C4 | 1,900° C. | 30 minutes | 2.445 | 76.2 |

Examples 5 Through 10

A total 189.96 grams of acid treated (treated in a mixture of 50-50 nitric acid and acetic acid as described above in regard to Examples 1 through 4) particulate green grain SiC having a mean particle size of about 0.65 microns was milled and blended with 1.22 grams of boron carbide (the same boron carbide as described above in regard to Examples 1 through 4), 5.00 grams of aluminum powder (the same aluminum powder as described above in regard to Examples 1 through 4), 8.69 grams of Plyophen ™ 90-151 phenolic resin, having a char yield 3.82 grams, (the same phenolic resin described above in regard to Examples 1 through 4) and 12 grams of polyvinyl alcohol (the same polyvinyl alcohol, dissolved in water, as described above in regard to Examples through 4) as a temporary binder were prepared as a blend, and sifted through an 80 mesh screen and dried, all in the same way as described above in regard to Examples 1 through 4.

About 5 grams of the resulting powder was then mold pressed for each green sample of Examples 5 through 10. Molding was performed using the same mold press as described above in regard to Examples 1 through 4, at a molding pressure of about 8 kilogram/mm², in a steel mold, to form green test bars of a size of about 50mm × 8mm × 5mm. About 1 Wt.% of each of boron carbide and aluminum powder were dusted around the green test bars to generate the desired sintering additive atmosphere, as described above in regard to Examples through 4. Sintering was performed at atmospheric pressure by firing the molded green test bars in a static argon atmosphere at an average rate of temperature increase (ramp-up rate) of 20° C. per minute. After the temperatures, as listed in Table 3, were maintained for the indicated retention time, the sintered bodies were allowed to cool in the same manner as described above in regard to Examples 1 through 4.

The densities of the resulting sintered test bars of Examples 5 through 10 were measured using the Archimedes method, and the resistivity was measured with a LCD digital multimeter (Micronta ® Model 22-185A obtained from Radio Shack). The results are listed in Table 3.

TABLE 3

| Example No. | Sintering temperature | Retention time | Relative density, % T.D. | Electrical conductivity, $(\Omega\text{-cm})^{-1}$ |
| --- | --- | --- | --- | --- |
| 5 | 2,150° C. | 20 minutes | 96.4 | 2.17 |
| 6 | 2,150° C. | 100 minutes | 91.7 | 5.54 |
| 7 | 2,060° C. | 60 minutes | 96.2 | 1.05 |
| 8 | 1,970° C. | 20 minutes | 96.0 | 0.08 |
| 9 | 1,970° C. | 100 minutes | 95.1 | 0.11 |
| 10 | 1,950° C. | 480 minutes | 99.1 | 1.92 |

Comparative Examples C5 and C6

About 5 grams of the raw batch blend from Examples C1 through C4 were then pressed into green test bars of a size about 60mm×8 mm×5mm, following the procedure described above in regard to Examples 5 through 10. About 1 Wt.%, in comparison to the weight of the green test bars, of boron carbide powder (but not aluminum powder) was dusted around these green test bars to create the desired sintering additive atmosphere. Sintering was performed in the same manner described in regard to Examples 5 through 10. After the temperatures, as listed in Table 4, were maintained for the indicated retention times, also listed in Table 4, the sintered bodies were allowed to cool in the same manner as described above in regard to Examples 5 through 10. The results are reported in Table 4.

TABLE 4

| Example No. | Sintering temperature | Retention time | Relative density, % T.D. | Electrical conductivity, $(\Omega\text{-cm})^{-1}$ |
| --- | --- | --- | --- | --- |
| C5 | 2,150° C. | 100 minutes | 97.6 | $3.35 \times 10^{-4}$ |
| C6 | 1,950° C. | 480 minutes | 84.3 | $5.54 \times 10^{-9}$ |

Examples 11 through 15

The raw batch blend composition of Examples through 4, instead of being ball milled, was milled using a Model M-18 Vibro-Energy grinding mill (manufactured by Sweco Company, U.S.A). The raw batch blend was milled for 41 hours, and an average particle size of about 0.4 micron was obtained. Green plate samples of the size of 60mm×30mm×6mm were pressed, using the same press and method described in regard to Examples 5 through 10, using a steel die. The sintering conditions and densities achieved are shown in Table 5.

TABLE 5

| Example No. | Sintering Temperature | Retention Time | Relative Density, % T.D. |
| --- | --- | --- | --- |
| 11 | 2,050° C. | 5 minutes | 98.4 |
| 12 | 2,050° C. | 55 minutes | 98.3 |
| 13 | 1,950° C. | 30 minutes | 98.5 |
| 14 | 1,850° C. | 5 minutes | 91.9 |
| 15 | 1,850° C. | 55 minutes | 97.0 |

Test Bars 1 through 21

Twenty-one (21) green specimens were prepared in accord with Examples 11 through 15 and sintered in accord with Example 13. All of those twenty-one (21) specimens were machined, after sintering, into test bars of a 50mm×4mm×3mm size. Flexural strength of each test bar was measured using a four point bend test method as described in detail in U.S. Department of the Army MIL-STD-1942A (8 Nov. 1990) entitled "FLEXURAL STRENGTH OF HIGH PERFORMANCE CERAMICS AT AMBIENT TEMPERATURE", using a lower span of 40 mm. The results of those four point bend strengths tests are listed in Table 6. Those bend strength test results are believed representative of the sintered materials of the present invention.

TABLE 6

| Test Bar No. | Bend Strength (MPa) | Test Bar No. | Bend Strength (MPa) |
| --- | --- | --- | --- |
| 1 | 513 | 12 | 582 |
| 2 | 339 | 13 | 527 |
| 3 | 419 | 14 | 363 |
| 4 | 563 | 15 | 583 |
| 5 | 417 | 16 | 413 |
| 6 | 180 | 17 | 682 |
| 7 | 443 | 18 | 543 |
| 8 | 501 | 19 | 425 |
| 9 | 453 | 20 | 643 |
| 10 | 263 | 21 | 463 |
| 11 | 403 | | |

Examples 16 through 21

A total of 185.1 grams of acid treated (treated in a mixture of 50-50 nitric acid and acetic acid as described in relation to Examples 1 through 4) particulate green grain SiC powder, having a mean particle size of about 0.65 microns was blended with 1.18 grams of boron carbide (as described in relation to Examples 1 through 4), 10.0 grams of aluminum nitride powder ("Ultra-Fine" grade, >97.0 Wt.% pure, produced by the direct nitridation method, mean particle size 2.0 microns, specific surface area 4.3 m²/grams, obtained from Toyo Aluminum K.K., Osaka, Japan), 8.49 grams of Plyophen TM 90-151 resin (char yield 3.72 grams as determined above in relation to Examples 1 through 4), and 12.0 grams of polyvinyl alcohol (temporary binder) were collectively ball-milled with SiC grinding media (as described in relation to Examples 1 through 4) for 41 hours in the presence of distilled water to cover both the ingredients and the media. The composition was then dried and sifted through an 80-mesh screen (also as described in relation to Examples 1 through 4).

About 5 grams of the resulting raw batch powder was then pressed for each green sample using a molding press (as described in relation to Examples 1 through 4) at a pressure of about 8 kilograms/mm² to form green test bars of 50mm×8mm×5mm in size in a steel die of equivalent size. About 1 Wt.% each of boron carbide and aluminum nitride powders were dusted around the green test bars to create the desired sintering atmosphere (as described above in relation to Examples 1 through 4).

Pressureless sintering was performed at atmospheric pressure by firing the molded green test bars in a static argon atmosphere at an average rate of temperature increase of 20° C. per minute. After the temperatures, as listed in Table 7, were reached and maintained for the indicated retention times, the sintered test bars were allowed to cool in the un-opened furnace until room temperature was reached.

The only significant differences between Examples 5 through 10, above, and these Examples 16 through 21, is that aluminum nitride was used as a sintering additive, and aluminum nitride was dusted around the green test bars, for Examples 16 through 21, while aluminum powder was used both as a sintering additive and a dusting material for Examples 5 through 10.

The density of the resulting Example 16 through 21 pressureless sintered test bars was measured using the Archimedes method, and the resistivity was measured using and LCD digital multimeter (Micronta ® 22-185A, obtained from Radio Shack), with those results being listed in Table 7.

TABLE 7

| Example No. | Sintering Temperature | Retention Time | Relative Density, % T.D. | Electrical Conductivity, $(\Omega\text{-cm})^{-1}$ |
|---|---|---|---|---|
| 16 | 2,150° C. | 20 minutes | 97.3 | 1.09 |
| 17 | 2,150° C. | 100 minutes | 97.2 | 2.80 |
| 18 | 2,060° C. | 60 minutes | 97.0 | 0.11 |
| 19 | 1,970° C. | 20 minutes | 97.6 | 0.000335 |
| 20 | 1,970° C. | 100 minutes | 97.7 | 0.00129 |
| 21 | 1,950° C. | 480 minutes | 97.9 | 0.00549 |

The density results show that aluminum nitride powder is also an effective additive to decrease the sintering temperature of SiC-B$_4$C-Al-C systems. The results indicate that other aluminum containing compounds should have similar effects in reducing densification temperature. Because aluminum nitride contains nitrogen, which is an n-type semiconductor dopant for silicon carbide, it tends to off-set or counter the p-type semiconductor dopant properties of aluminum in the SiC crystalline lattice structure. If both aluminum and nitrogen are present in equal atomic concentrations, each will cancel the semiconductor dopant property capabilities of the other, as n-type semiconductor materials (those impurity additives which add a negative electron carrier to the SiC crystalline lattice structure) will neutralize p-type semiconductor material (those impurity additives which add a positive electron carrier to the SiC crystalline lattice structure). Examples of p-type dopant impurities are aluminum and boron, and examples of n-type dopant impurities are nitrogen and phosphorous. Thus, if enhanced electrical conductivity is of critical concern in the sintered SiC articles, it is preferred that n-type dopant materials not be introduced into the material system in levels sufficient to serve to either partially or wholly neutralize the p-type dopant capabilities of aluminum and boron. This caveat applies as well to the use of nitrogen as a sintering atmosphere as mentioned above. Note the low electrical conductivity of Examples 19 through 21, although for use where electrical conductivity is not a critical consideration, i.e., for solely structural applications, Examples 19 through 21 may well be quite acceptable.

Examples 1 and 10 were analyzed to determine the chemical composition of the final sintered articles. The results of that analysis are as follows in Table 8:

TABLE 8

| EXAMPLE 1 | | EXAMPLE 10 | |
|---|---|---|---|
| SiC | 97.0 Wt. % | SiC | 95.6 Wt. % |
| Al | 1.12 Wt. % | Al | 2.46 Wt. % |
| B | 0.48 Wt. % | B | 0.51 Wt. % |
| C (free) | 0.92 Wt. % | C (free) | 1.10 Wt. % |
| Si (free) | 0.04 Wt. % | Si (free) | 0.01 Wt. % |
| O | 0.06 wt. % | O · | 0.08 Wt. % |
| N | 0.12 Wt. % | N | 0.12 Wt. % |

Examples 22 through 28

Each of Examples 22 through 28 was prepared using the same materials and procedures set forth above in relation to Examples 1 through 4, with the difference being that the weight percentages of SiC, A1, B$_4$C and C were altered to produce raw batch formulations as set forth in Table 9, following. The molding was performed in the same manner as set forth above in relation to Examples through 15, and the same amounts of aluminum and boron carbide dust were introduced to the shaped (molded) green samples, prior to sintering, as set forth in relation to Examples 11 through 15, to provide partial pressures of those materials in the sintering atmosphere Sintering was performed in accord with the procedure set forth in relation to Examples 1 through 4, with the exception being that the static argon atmosphere was replaced with a flowing argon atmosphere, the argon flowing at a rate of 0.04 cubic feet per minute. For Each of Examples 22 through 28, the sintering temperature was 1,950 ° C. for 30 minutes. The density for each specimen was determined by the Archimedes method, and electrical conductivity for each was determined in the same manner set forth above in relation to Examples 11 through 15; the results of those density and electrical conductivity determinations are also set forth in Table 9.

TABLE 9

| Example Number | SiC Wt. % | Al, Wt. % | B$_4$C, Wt. % | C, Wt. % | Relative Density, % T.D. | Electrical conductivity, $(\Omega\text{-cm})^{-1}$ |
|---|---|---|---|---|---|---|
| 22 | 97.4 | 0.0 | 0.6 | 2.0 | 84.4 | 0.014 |
| 23 | 97.0 | 1.0 | 0.0 | 2.0 | 85.6 | 0.021 |
| 24 | 98.4 | 1.0 | 0.6 | 0.0 | 79.3 | 0.0035 |
| 25 | 97.7 | 0.1 | 0.1 | 2.0 | 81.2 | 0.0061 |
| 26 | 90.0 | 6.5 | 1.8 | 1.7 | 97.5 | 12.7 |
| 27 | 92.33 | 0.67 | 5.0 | 2.0 | 88.8 | 0.032 |
| 28 | 93.73 | 0.67 | 0.6 | 5.0 | 87.6 | 0.24 |

The purpose of producing Examples 22 through 27 was to explore and demonstrate the density and electrical conductivity parameters of a range of amounts of aluminum, boron carbide and carbon sintering additives. Note that In Example 22 there is no aluminum sintering additive, that in Example 23 there is no boron carbide sintering additive and that in Example 24 there is no carbon sintering additive. Also note that in Example 26 there is an addition of 6.5 Wt.% aluminum and a density of 97.5%, with by far the greatest degree of electrical conductivity of any of Examples 22 through 28, while all other of Examples 22 through 28 showed a density of less than 90% as well as considerably lesser degrees of electrical conductivity. Finally, note that Example 27 includes the addition of 5.0 Wt.% of boron carbide and Example 28 includes the addition of 5.0 Wt.% of carbon, respectively, as sintering additives.

Examples 29 and 30

Both of Examples 29 and 30 were prepared using the same materials and procedures set forth above in relation to Examples 1 through 4, however, the weight percentages of SiC, Al and C were altered to produce raw batch formulations as set forth in Table 10. The most significant difference was that no boron carbide was used in the raw batch formulation of Examples 29 and 30, but rather elemental boron was used. Elemental boron of rather high purity (reagent grade), in powder form, was obtained from Callery Chemical Company, Pittsburgh, Pa., U.S.A. and used in that powder form in the raw batch formulation in the weight percentages indicated in Table 10. The molding of the green bodies was performed in the same manner as set forth above in relation to Examples through 15, and the same amounts of aluminum and elemental boron (instead of boron carbide) were introduced to the shaped (molded) green samples, prior to sintering, as set forth in relation to Examples 11 through 15, to provide a partial pressure of those materials in the sintering atmosphere.

Sintering was performed in accord with the procedure set forth in relation to Examples 1 through 4, with the exception being that the static argon atmosphere was replaced with a flowing argon atmosphere, the argon flowing at a rate of 0.04 cubic feet per minute. For both of Examples 29 and 30, the sintering temperature was 1,950° C. for 30 minutes. The density for each specimen was determined by the Archimedes method, and electrical conductivity for each was determined in the same manner set forth above in relation to Examples 11 through 15; the results of those density and electrical conductivity determinations are also set forth in Table 10.

TABLE 10

| Example Number | SiC Wt. % | Al Wt. % | Boron Wt. % | Carbon Wt. % | Relative Density, % T.D. | Electrical conductivity, $(\Omega\text{-cm})^{-1}$ |
|---|---|---|---|---|---|---|
| 29 | 97.08 | 0.67 | 0.25 | 2.00 | 96.1 | 0.15 |
| 30 | 95.50 | 1.00 | 1.00 | 2.50 | 98.0 | 1.12 |

Thus, from the results reported in Table 10, the use of elemental boron, as an alternative for boron carbide, produces articles which are well within the scope of the present invention.

What is claimed is:

1. A pressureless sintered silicon carbide ceramic composite article having a D.C. electrical conductivity of at least 0.05 $(\Omega\text{-cm})^{-1}$, a bulk density of at least 2.9 grams per cubic centimeter, as measured by the Archimedes method, and a flexural bend strength of at least 150 MPa, as measured by a four point bend strength test, and capable of exhibiting p-type silicon carbide semiconductor characteristics, said article comprising from about 0.5 Wt.% to about 6.0 Wt.% of aluminum, from about 0.1 Wt % to about 2.0 Wt.% of boron, said aluminum being present in at least as great a percentage by weight as said boron, from about 0.1 Wt.% to about 6.0 Wt.% of free carbon, and at least about 90.0 Wt.% of silicon carbide, said silicon carbide being predominantly of the alpha phase.

2. The composite of claim 1 wherein said boron is present in the range of from about 0.3 Wt.% to about 2.0 Wt.%.

3. The composite of claim 1 wherein said free carbon is present in the range of from about 0.1 Wt.% to about 2.0 Wt.%.

4. The composite of claim 1 wherein said silicon carbide ceramic composite article has a bulk density of at least 3.1 g/cm$^3$.

5. The composite of claim 1 wherein said silicon carbide ceramic composite article has a flexural bend strength of at least 400 MPa.

6. The composite of claim 1 wherein said silicon carbide comprises at least 90.0 Wt.% of alpha phase silicon carbide.

7. A process for producing a pressureless sintered silicon carbide ceramic composite article having a D.C. electrical conductivity of at least 0.05 $(\Omega\text{-cm})^{-1}$, a density of at least 2.9 grams per cubic centimeter, as measured by the Archimedes method, and a flexural bend strength of at least 150 MPa, as measured by a four point bend strength test, and capable of exhibiting p-type silicon carbide semiconductor characteristics, said process which comprises:

(a) milling and blending at least 90 Wt.% silicon carbide, said silicon carbide initially having a maximum particle size of about 100 microns, said silicon carbide being predominantly of the alpha phase, with from about 0.5 Wt.% to about 6.0 Wt.% of at least one aluminum containing additive, from about 0.1 Wt.% to about 2.0 Wt.% of at least one boron containing additive, the total aluminum of said at least one aluminum containing additive being present in as great a percentage by weight as the total boron of said at least one boron containing additive, and at least one carbon source material capable of providing free carbon, in an amount capable of providing from about 0.1 Wt.% to about 6.0 Wt.% of said free carbon, to produce a raw batch blend;

(b) forming and compacting said raw batch blend into a shaped body; and (c) heating said shaped body in an atmosphere inert to said silicon carbide, said aluminum containing additive, said boron containing additive, and said free carbon to obtain said pressureless sintered silicon carbide composite article.

8. The process of claim 7 wherein said amount of said at least one carbon source material is capable of providing from about 0.1 Wt.% to about 3.0 Wt.% of said free carbon, 9. The process of claim 7 wherein said at least one aluminum containing additive comprises aluminum powder.

10. The process of claim 7 wherein said at least one boron containing additive comprises boron carbide and wherein said boron carbide is milled and blended in an amount within the range of from about 0.3 Wt.% to about 2.0 Wt.%.

11. The process of claim 7 wherein said at least one carbon source material comprises phenolic resin.

12. The process of claim 8 wherein said at least one carbon source material comprises phenolic resin.

13. The process of claim 7 wherein said milling and blending further comprises the addition of a temporary binder.

14. A raw batch blend from which can be produced a pressureless sintered silicon carbide ceramic composite article having a D.C. electrical conductivity of at least 0.05 (Ω-cm)$^{-1}$, a density of at least 2.9 grams per cubic centimeter, as measured by the Archimedes method, and a flexural bend strength of at least 150 MPa, as measured by a four point bend strength test, and capable of exhibiting p-type silicon carbide semiconductor characteristics, said raw batch blend comprising:
- at least 90 Wt.% silicon carbide, said silicon carbide initially having a maximum particle size of about 100 microns, said silicon carbide being predominantly of the alpha phase;
- (b) from about 0.5 Wt.% to about 6.0 Wt.% of at least one aluminum containing additive;
- (c) from about 0.1 Wt.% to about 2.0 Wt.% of at least one boron containing additive; and
- (d) at least one carbon source material capable of providing free carbon, in an amount capable of providing from about 0.1 Wt.% to about 6.0 Wt.% of said free carbon;

wherein said total aluminum of said at least one aluminum containing additive is present in at least as great a percentage by weight as the total boron of said at least one boron containing additive.

15. The batch of claim 14 wherein said maximum size of said silicon carbide particles is about 5 microns.

16. The batch of claim 15 wherein said silicon carbide has a BET surface area in the range of about 1 to about 20 square meters per gram.

17. The batch of claim 14 wherein said silicon carbide is at least 97.5 % pure.

18. The batch of claim 14 wherein said free carbon is amorphous carbon.

19. The batch of claim 14 wherein said at least one boron containing additive comprises boron carbide.

20. The batch of claim 14 wherein said at least one aluminum containing additive comprises aluminum powder.

21. A pressureless sintered silicon carbide ceramic composite article having a bulk density of at least 3.1 grams per cubic centimeter, as measured by the Archimedes method, and a flexural bend strength of at least 400 MPa, as measured by a four point bend strength test, said article comprising from about 0.5 Wt.% to about 6.0 Wt.% of aluminum, from about 0.1 Wt.% to about 2.0 Wt.% of boron, said aluminum being present in at least as great a percentage by weight as said boron, from about 0.1 Wt.% to about 6.0 Wt.% of free carbon, and at least about 90.0 Wt.% of silicon carbide, said silicon carbide being predominantly of the alpha phase.

22. A process for producing a pressureless sintered silicon carbide ceramic composite article having a density of at least 3.1 grams per cubic centimeter, as measured by the Archimedes method, and a flexural bend strength of at least 400 MPa, as measured by a four point bend strength test, said process which comprises:
- (a) milling and blending at least 90 Wt.% silicon carbide, said silicon carbide initially having a maximum particle size of about 100 microns, said silicon carbide being predominantly of the alpha phase, with from about 0.5 Wt.% to about 6.0 Wt.% of at least one aluminum containing additive, from about 0.1 Wt.% to about 2.0 Wt.% of at least one boron containing additive, the total aluminum of said at least one aluminum containing additive being present in as great a percentage by weight as the total boron of said at least one boron containing additive, and at least one carbon source material capable of providing free carbon, in an amount capable of providing from about 0.1 Wt.% to about 6.0 Wt.% of said free carbon, to produce a raw batch blend;
- (b) forming and compacting said raw batch blend into a shaped body; and
- (c) heating said shaped body in an atmosphere inert to said silicon carbide, said aluminum containing additive, said boron containing additive, and said free carbon to obtain said pressureless sintered silicon carbide ceramic composite article.

23. A raw batch blend from which can be produced a pressureless sintered silicon carbide ceramic composite article having a density of at least 3.1 grams per cubic centimeter, as measured by the Archimedes method, and a flexural bend strength of at least 400 MPa, as measured by a four point bend strength test, said raw batch blend comprising:
- (a) at least 90 Wt.% silicon carbide, said silicon carbide initially having a maximum particle size of about 100 microns, said silicon carbide being predominantly of the alpha phase;
- (b) from about 0.5 Wt.% to about 6.0 Wt.% of at least one aluminum containing additive;
- (c) from about 0.1 Wt.% to about 2.0 Wt.% of at least one boron containing additive; and
- (d) at least one carbon source material capable of providing free carbon, in an amount capable of providing from about 0.1 Wt.% to about 6.0 Wt.% of said free carbon;

wherein said total aluminum of said at least one aluminum containing additive is present in at least as great a percentage by weight as the total boron of said at least one boron containing additive.

* * * * *